United States Patent [19]  [11] 3,813,002
Gurklis  [45] May 28, 1974

[54] WELDED JOINT ASSEMBLY
[75] Inventor: Peter J. Gurklis, Lake Jackson, Tex.
[73] Assignee: The Dow Chemical Company, Midland, Mich.
[22] Filed: Jan. 10, 1972
[21] Appl. No.: 216,393

[52] U.S. Cl. .............................. 220/63 R, 220/63
[51] Int. Cl. ........................................ B65d 25/14
[58] Field of Search ................................ 220/63 R

[56] References Cited
UNITED STATES PATENTS
2,198,331  4/1940  Chyle .............................. 220/63 R
2,209,290  7/1940  Watts .............................. 220/63 R
2,321,777  6/1943  Schelhammer .................. 220/65 R
2,818,995  1/1958  Duguid ........................... 220/63 R Primary Examiner—George E. Lowrance
Attorney, Agent, or Firm—Earl D. Ayers

[57] ABSTRACT

The invention comprises a joint structure for use in providing metal linings in pressure vessels and tanks. Abutting edges of liner material are sealed (welded, usually) to strips on each side of the abutting edges. A closable tap element is sealed to the strip adjacent to the vessel wall and extends through the wall. If a leak occurs along the inner strip seal, fluid is confined to the space between the inner and outer seal strips, isolated from the vessel wall. Leaking fluid is removed via the tap elements which are suitably located along the joint assembly.

2 Claims, 2 Drawing Figures

PATENTED MAY 28 1974 3,813,002

3,813,002

WELDED JOINT ASSEMBLY

BACKGROUND OF THE INVENTION

This invention relates to welded joints and particularly to welded joint assemblies adapted for use in lining tank or vessel walls.

The present conventional methods of installing linings in tanks or vessels do not lend themselves to reliable testing for leaks. When leaks do occur in service, the contained fluid (usually corrosive) comes in contact with the vessel walls and often causes serious damage.

Accordingly, a principal object of this invention is to provide an improved welded joint assembly.

Another object of this invention is to provide an improved, more reliable welded joint assembly for use in lining vessels or tanks.

A further object of this invention is to provide an improved welded joint assembly which is well adapted for pressure testing procedures.

STATEMENT OF THE INVENTION

In accordance with this invention there is provided a welded joint between the edges of adjacent sheets of metal tank lining material wherein a first joining strip is welded in a continuous weld along its outer edges to the wall of the vessel to be lined. A closable tubular element extends through the joining strip and the wall of the tank or vessel and is welded around its periphery to both the joining strip and the wall.

The edges of the adjacent sheets of lining material then are welded to the first joining strip. A second joining strip is then placed over the adjacent facing edges of the sheets of lining material and is continuously welded along its edges to the sheets of lining material.

Thus, before the contents of the vessel or tank contact the walls of the vessel or tank, a leak must occur both in the weld along the second joining strip plus along the weld along the first joining strip.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 1:
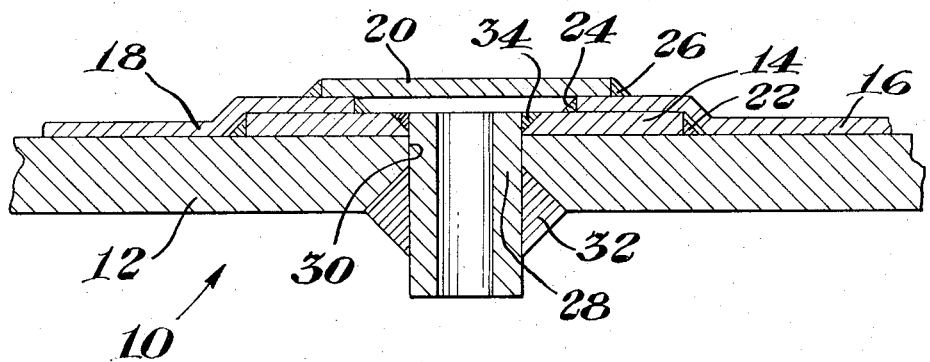
FIG. 1 is a sectional view of a welded joint assembly in accordance with this invention.

Referring to FIG. 1, there is shown a welded joint assembly, indicated generally by the numeral 10, comprising a tank wall 12, a first joining strip 14 welded to the wall 12 by weld line 22, for example.

Edges of vessel lining sheets 16, 18 are placed against the surface of the strip 14 and are welded thereto in a continuous bead, 24, for example. The edge parts of the sheets 16, 18 are preferably bent as shown to facilitate holding the sheets against the strip 14 while welding is taking place.

A bore 30 extends through the vessel wall 12 in alignment with a similar bore in the strip 14. A closable tubular element 28 extends through the bores and is continuously welded around its periphery to the strip 14 and to the vessel wall 12 by welds 32, 34. The outer end of the tubular element 28 may be plugged or closed by other suitable means (it may be threaded and closed by a cap, for example).

A second cover strip 20 is placed across the welded edges of the liner sheets, 16, 18 and is welded to the sheets 16, 18 along its edges, as by the continuous weld 26.

As may be seen from the drawing, a break or leak along the continuous weld 26 (along either edge) will not result in fluid contacting the wall 12, as the leaked fluid is confined within the space between the edges of liner sheets 16, 18 and the strips 14, 20.

Any leaked fluids may be withdrawn through the closable element 28, assuming that the element 28 is located at or near the bottom of the liner seam.

Figure 2:
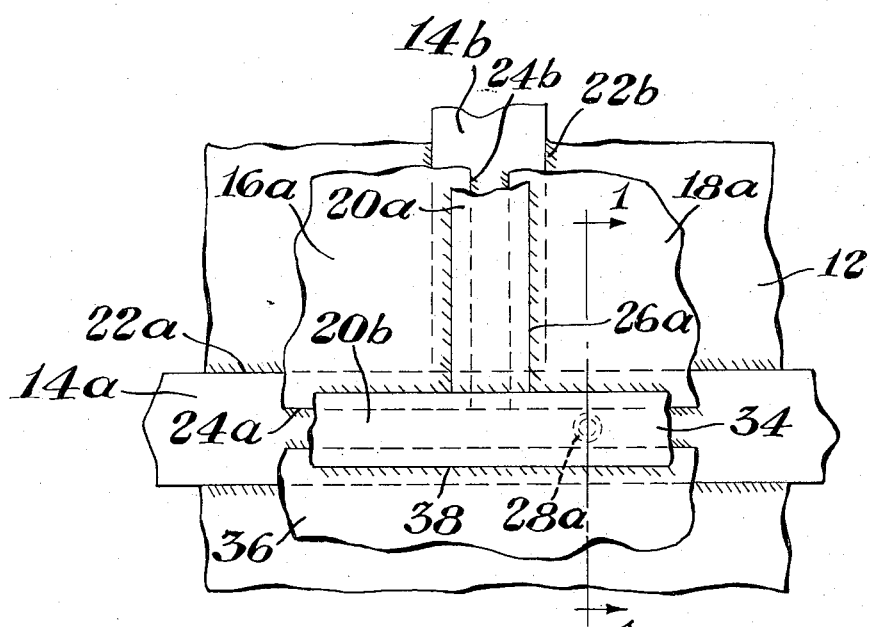
FIG. 2 is a fragmentary plan view in accordance with this invention.

Referring now to FIG. 2, three liner sheets 16a, 18a and 36 are shown against the vessel wall 12. A horizontal first cover strip 14a is continuously welded along its edges, as at 22a, for example, to the wall 12.

A perpendicularly aligned similar cover strip 14b is welded to the wall 12 along its edges and also welded to the edge of the strip 14a against which it abuts.

The edges of the liner sheets 16a, 18a lie over both the strip 14a and 14b. The liner sheet 36 has an edge along the strip 14a. The edges of the liner sheets 16a, 18a and 36 are continuously welded to the strip 14a and, in the case of sheets 16a, 18a, also to strip 14b by welds 24a, 24b, for example.

Upper cover strips 20a, 20b, corresponding to the second cover strip 20, are placed across and over the edges and are continuously welded along their edges, as a 26a and 38, for example. The abutting end edge of strip 20a is continuously welded to the edge of strip 20b. A closable tubular element 28a communicates with the space defined by strips 14a, 20b and sheets 16a, 18a and the sheet 36.

Thus, if any leak occurs along the inner welds between liner sheets 16a, 18a and 36, fluid may be withdrawn through the tubular element 28a.

The view in FIG. 2 represents a horizontal junction of liner sheets and one of a series of vertically extending side junctions. The vessel lining may be divided into a number of zones, each zone having at least one tubular element 28 extending from the weld joint of the zone to the exterior of the vessel. The weld joint assembly of this invention also provides a convenient means whereby pressure testing of the joint area may be carried out without pressurizing the large volume of the vessel. Higher pressure usually may be applied to the joint area than if the entire lining of the vessel were to be pressurized.

What is claimed is:

1. A welded joint assembly for use in lining the walls of a tank or vessel with metal sheets of lining material, comprising a first metal sealing strip, said first sealing strip being continuously edge welded to the wall of said tank or vessel, at least two lining sheets, said sheets being disposed adjacent to but spaced from each other with each sheet having an edge which overlaps said first sealing strip, said edges each being continuously welded and sealed to said first sealing strip, a second metal sealing strip, said second sealing strip lying over said first sealing strip and overlapping said welded edges of said lining sheets, the edges of said second strip being continuously welded and sealed to said lining sheets, and a closable tubular member, said closable member extending through and sealed to said wall and said first sealing strip, said tubular member communicating with the enclosed space between two adjacent edges of said at least two lining sheets.

2. An assembly in accordance with claim 1, wherein said lining sheets are made of corrosion resisting metal.

* * * * *